(12) United States Patent
Shpiner et al.

(10) Patent No.: US 12,719,796 B2
(45) Date of Patent: Aug. 25, 2026

(54) SYSTEMS, DEVICES, AND METHODS FOR NETWORK CONGESTION CONTROL

(71) Applicant: Mellanox Technologies, Ltd., Yokneam (IL)

(72) Inventors: Alexander Shpiner, Ramat Yishay (IL); Yuval Shpigelman, Netanya (IL); Tal Mund, Herzelia (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/390,136

(22) Filed: Dec. 20, 2023

(65) Prior Publication Data

US 2025/0211535 A1 Jun. 26, 2025

(51) Int. Cl.

*H04L 47/17* (2022.01)
*H04L 45/16* (2022.01)
*H04L 47/12* (2022.01)

(52) U.S. Cl.

CPC .............. *H04L 47/17* (2013.01); *H04L 45/16* (2013.01); *H04L 47/12* (2013.01)

(58) Field of Classification Search

CPC ......... H04L 47/17; H04L 45/16; H04L 47/12; H04L 47/11; H04L 47/263; H04L 47/10; H04L 47/125; H04L 47/24; H04L 47/25

See application file for complete search history.

(56) References Cited

U.S. PATENT DOCUMENTS 11,711,318 B1 7/2023 Patronas et al.
2019/0182161 A1* 6/2019 Ravi .................. H04L 47/2425
2022/0078119 A1* 3/2022 Goyal ................... H04L 47/122
2022/0086080 A1* 3/2022 Huang ................ H04L 47/2441
2023/0055046 A1* 2/2023 Whited ................. H04J 3/0644
2023/0336483 A1* 10/2023 Moshref ................ H04L 47/12

(Continued)

FOREIGN PATENT DOCUMENTS

WO WO-2025031579 A1 * 2/2025 ............ H04L 47/39

OTHER PUBLICATIONS

Patronas et al., Pending U.S. Appl. No. 18/083,981, filed Dec. 19, 2022.

(Continued)

*Primary Examiner* — Tonia L Dollinger
*Assistant Examiner* — Mehulkumar J Shah
(74) *Attorney, Agent, or Firm* — Alston & Bird LLP

(57) ABSTRACT

Some embodiments described herein provide a method for reducing congestion in a network using per-hop telemetry data and network adapters implementing such a method. As compared to conventional congestion control mechanisms, the method may include sharing telemetry data between flows on a per-hop basis to accelerate the convergence of congestion control efforts in a multi-flow network environment. In some embodiments, a destination network adapter may be configured to generate a response packet that includes all of the telemetry data for a packet without combining it, such that the response packet includes distinct telemetry data for each hop in the flow. A sender network adapter may be configured to parse the telemetry data in the response packet to determine the queue length and the link utilization for each hop in the flow through the network, which it then uses to determine a hop rate for each hop in the flow.

25 Claims, 3 Drawing Sheets

(56) References Cited

U.S. PATENT DOCUMENTS

| | | | | |
|---|---|---|---|---|
| 2023/0403233 | A1* | 12/2023 | Rahman | H04L 49/9047 |
| 2023/0412283 | A1* | 12/2023 | Bushnaq | H04B 13/02 |
| 2024/0039849 | A1 | 2/2024 | Weiner et al. | |
| 2024/0073143 | A1* | 2/2024 | Sharma Banjade | H04L 47/283 |
| 2024/0098039 | A1 | 3/2024 | Patronas et al. | |
| 2024/0098040 | A1 | 3/2024 | Patronas et al. | |
| 2024/0146659 | A1* | 5/2024 | Xu | H04L 41/16 |
| 2024/0195725 | A1* | 6/2024 | Rajamanickam | H04L 45/20 |
| 2024/0430188 | A1* | 12/2024 | Gandhi | H04L 43/04 |

OTHER PUBLICATIONS

Patronas et al., Pending U.S. Appl. No. 17/964,367, filed Oct. 12, 2022.

Bashan et al., Pending U.S. Appl. No. 18/100,632, filed Jan. 24, 2023.

Urman et al., Pending U.S. Appl. No. 18/242,637, filed Sep. 6, 2023.

Moshe et al., Pending U.S. Appl. No. 18/224,258, filed Jul. 20, 2023.

Moshe et al., Pending U.S. Appl. No. 18/224,262, filed Jul. 20, 2023.

Miao et al., "HPCC++: Enhanced High Precision Congestion Control draft-miao-ccwg-hpcc-00; draft-miao-ccwg-hpcc-00.txt"; Jul. 2023; Downloaded from the Internet Jul. 7, 2023 at https://tools.ietf.org/html/draft-miao -ccwg-hpcc-00; 18 pages.

Konstantinos et al., "Deterministic and Probabilistic P4-Enabled Lightweight In-Band Network Telemetry";IEEE Transactions on Network and Service Management, IEEE; vol. 20, No. 4, Dec. 2023; pp. 4909-4922.

* cited by examiner

SYSTEMS, DEVICES, AND METHODS FOR NETWORK CONGESTION CONTROL

FIELD OF THE INVENTION

The present invention relates to methods and network adapters for reducing congestion in a network using per-hop telemetry-based network congestion control.

BACKGROUND

Network congestion occurs when a network device or node in a network is required to carry more data traffic than it is capable of transmitting or forwarding, which can result in deterioration of service quality. Typical effects of congestion include queueing delay, packet loss, and blocking of new connections. Network adapters use conventional congestion control techniques to try to mitigate congestion.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention is directed to a method for reducing congestion in a network. The method may include receiving, at a first network adapter, a packet transmitted by a second network adapter via a first flow through a network, where the first flow includes multiple hops. The method may include transmitting, using the first network adapter, to the second network adapter and in response to receiving the packet, a response packet including telemetry data for each hop of the first flow. The method may include receiving, at the second network adapter, the response packet and determining, using the second network adapter and using the telemetry data, hop rates for the multiple hops of the first flow.

In some embodiments, the method may include determining the hop rates for the multiple hops of the first flow in response to receiving the response packet.

In some embodiments, the method may include determining, for at least two hops of the first flow, a hop rate for each hop of the at least two hops.

In some embodiments, the method may include determining, for each hop of the first flow, a hop rate.

In some embodiments, the telemetry data may include a queue length and a link utilization for each hop of the first flow. Additionally, or alternatively, determining hop rates for the multiple hops of the first flow may include determining a hop rate for a given hop based on a current state of the given hop, the queue length of the given hop, and/or the link utilization of the given hop.

In some embodiments, the method may include determining, using the second network adapter, a flow rate of a second flow through the network using a determined hop rate of at least one hop of the first flow, where the second flow is different from the first flow, and where the second flow includes the at least one hop. Additionally, or alternatively, determining the flow rate of the second flow may include determining hop rates for hops of the second flow by determining, for each hop of the second flow, a hop rate, determining a lowest hop rate of the hop rates for the hops of the second flow, and determining that the flow rate of the second flow is the lowest hop rate.

In some embodiments, the network may include a plurality of network devices, where the plurality of network devices includes the first network adapter, the second network adapter, multiple switches, and/or an uplink, and where each hop of the first flow corresponds to the packet passing from one of the network devices to another of the network devices.

In some embodiments, the network may have a multi-level topology, and the method may include determining flow rates for flows through the network based on the multi-level topology.

In some embodiments, the packet may be a telemetry probe packet.

In some embodiments, the packet may include a telemetry header for collecting the telemetry data.

In another aspect, the present invention is directed to a network adapter coupled to a network. The network adapter may include a port configured to transmit and receive packets on a network and circuitry communicatively coupled to the port. The circuitry may be configured to transmit, using the port, a packet to another network adapter via a first flow through the network, where the first flow includes multiple hops. The circuitry may be configured to receive, at the port and in response to transmitting the packet, a response packet from the other network adapter, where the response packet includes telemetry data for each hop of the first flow. The circuitry may be configured to determine, in response to receiving the response packet, hop rates for the multiple hops of the first flow using the telemetry data.

In some embodiments, the circuitry may be configured to determine, for at least two hops of the first flow, a hop rate for each hop of the at least two hops.

In some embodiments, the telemetry data may include a queue length and a link utilization for each hop of the first flow. Additionally, or alternatively, the circuitry may be configured to, when determining hop rates for the multiple hops of the first flow, determine a hop rate for a given hop based on a current state of the given hop, the queue length of the given hop, and/or the link utilization of the given hop.

In some embodiments, each network device in the network may be configured to, in response to receiving a given packet via a given hop, append telemetry data for the given hop to any telemetry data in the given packet. Additionally, or alternatively, the telemetry data of the response packet may be the appended telemetry data. In some embodiments, the circuitry may be configured to parse, in response to receiving the response packet, the appended telemetry data to determine the hop rate for each hop of the first flow.

In some embodiments, the circuitry may be configured to determine a flow rate of a second flow through the network using a determined hop rate of at least one hop of the first flow, where the second flow is different from the first flow, and where the second flow includes the at least one hop. Additionally, or alternatively, the circuitry may be configured to, when determining the flow rate of the second flow, determine hop rates for hops of the second flow by determining, for each hop of the second flow, a hop rate, determine a lowest hop rate of the hop rates for the hops of the second flow, and determine that the flow rate of the second flow is the lowest hop rate.

In some embodiments, the network may have a multi-level topology, and the circuitry may be configured to determine flow rates for flows through the network based on the multi-level topology.

In some embodiments, the packet may be a telemetry probe packet.

In another aspect, the present invention is directed to a network adapter coupled to a network. The network adapter may include a port configured to transmit and receive packets on a network and circuitry communicatively coupled to the port. The circuitry may be configured to receive, using the port, a packet transmitted by another network adapter via a first flow through the network, where the first flow includes multiple hops. The circuitry may be configured to generate, in response to receiving the packet, a response packet including telemetry data for each hop of the first flow. The circuitry may be configured to transmit, using the port, to the other network adapter and in response to receiving the packet, the response packet.

In some embodiments, each network device in the network may be configured to, in response to receiving a given packet via a given hop, append telemetry data for the given hop to any telemetry data in the given packet.

In some embodiments, the packet may include appended elements of the telemetry data from each network device in the first flow, and the circuitry may be configured to determine, in response to receiving the packet, which network device in the first flow appended each appended element of the appended elements of the telemetry data.

In some embodiments, the network may have a multi-level topology, and the circuitry may be configured to determine which network device in the first flow appended each appended element of the appended elements of the telemetry data based on the multi-level topology.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
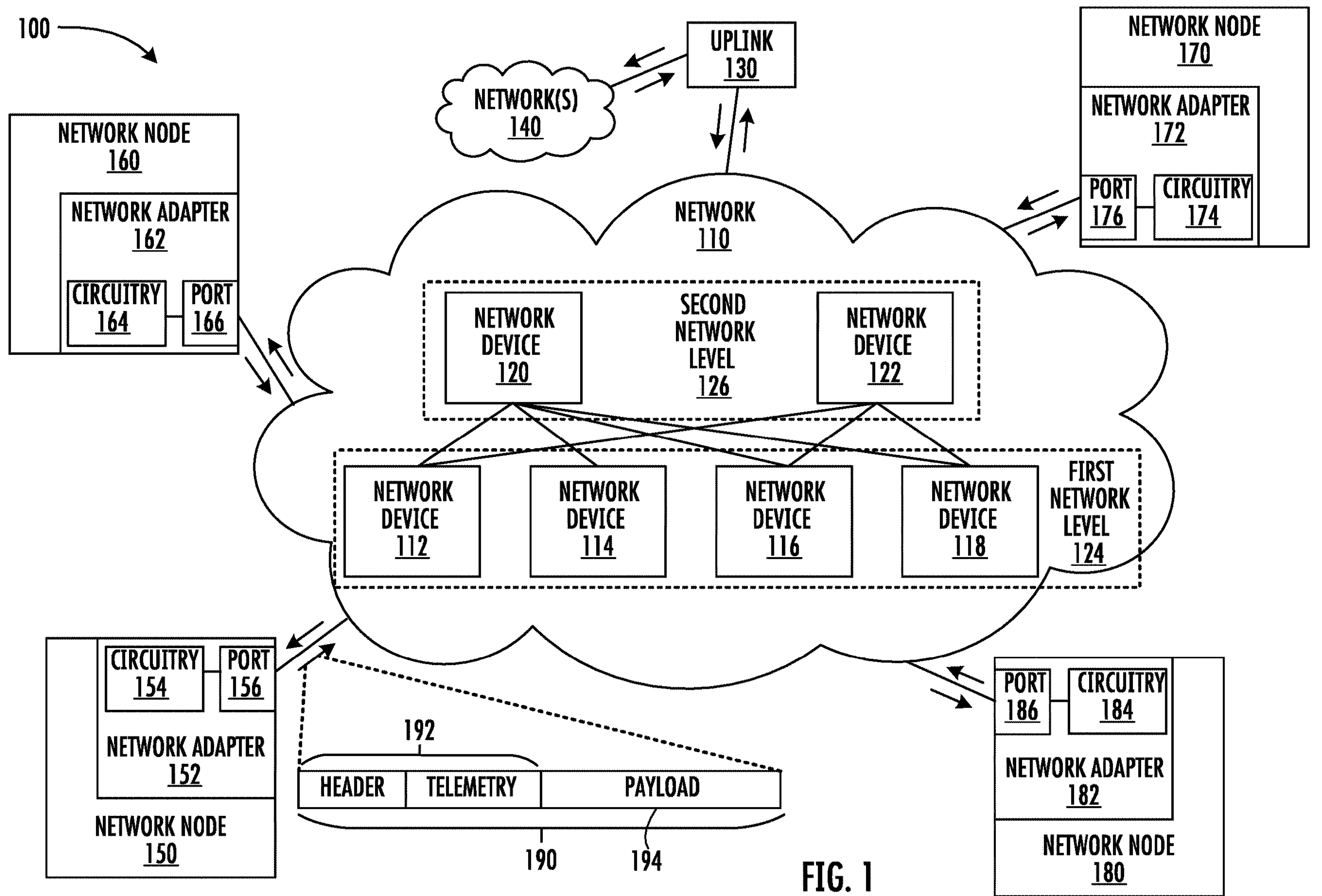
Figure 2:
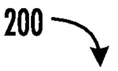
Figure 2:
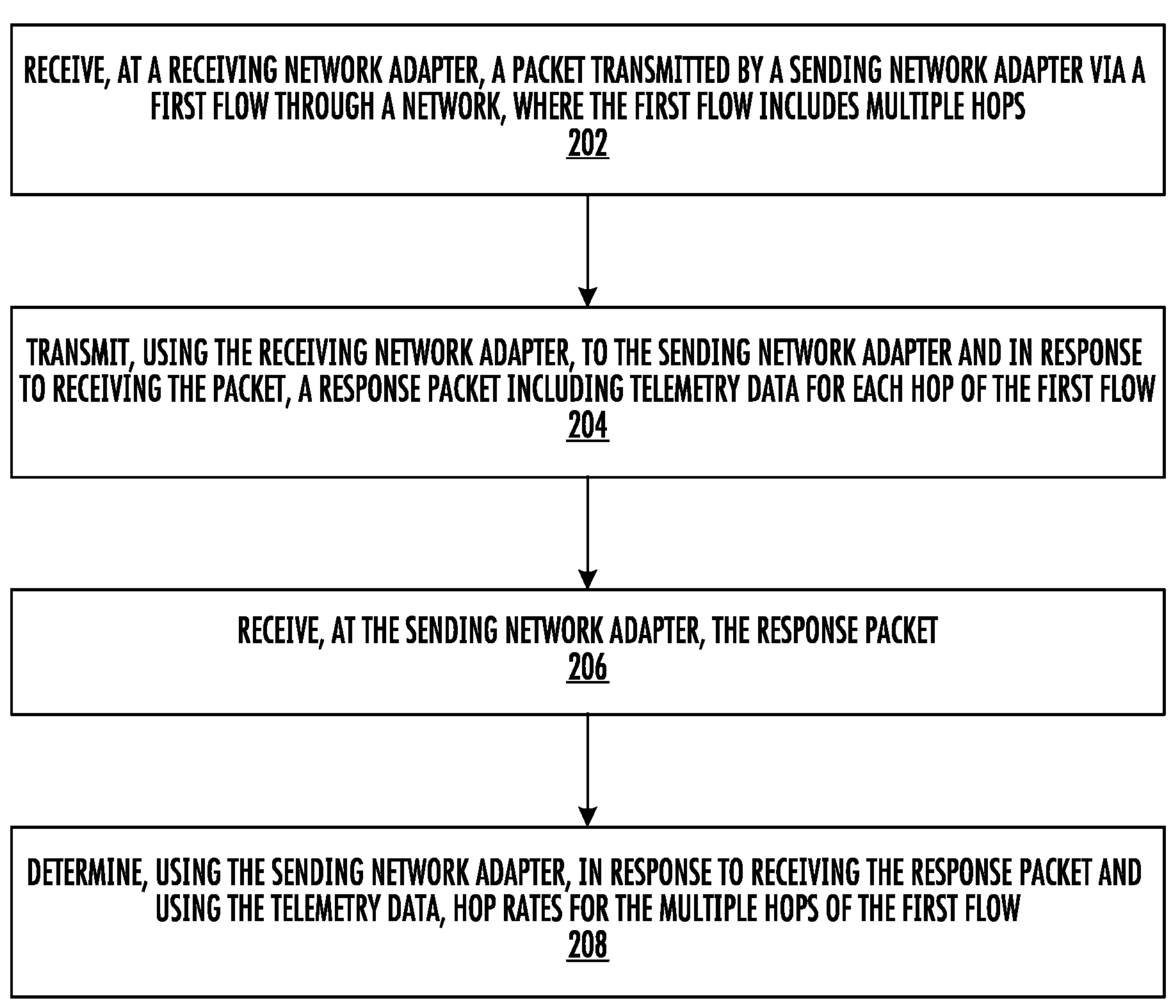
Figure 3:
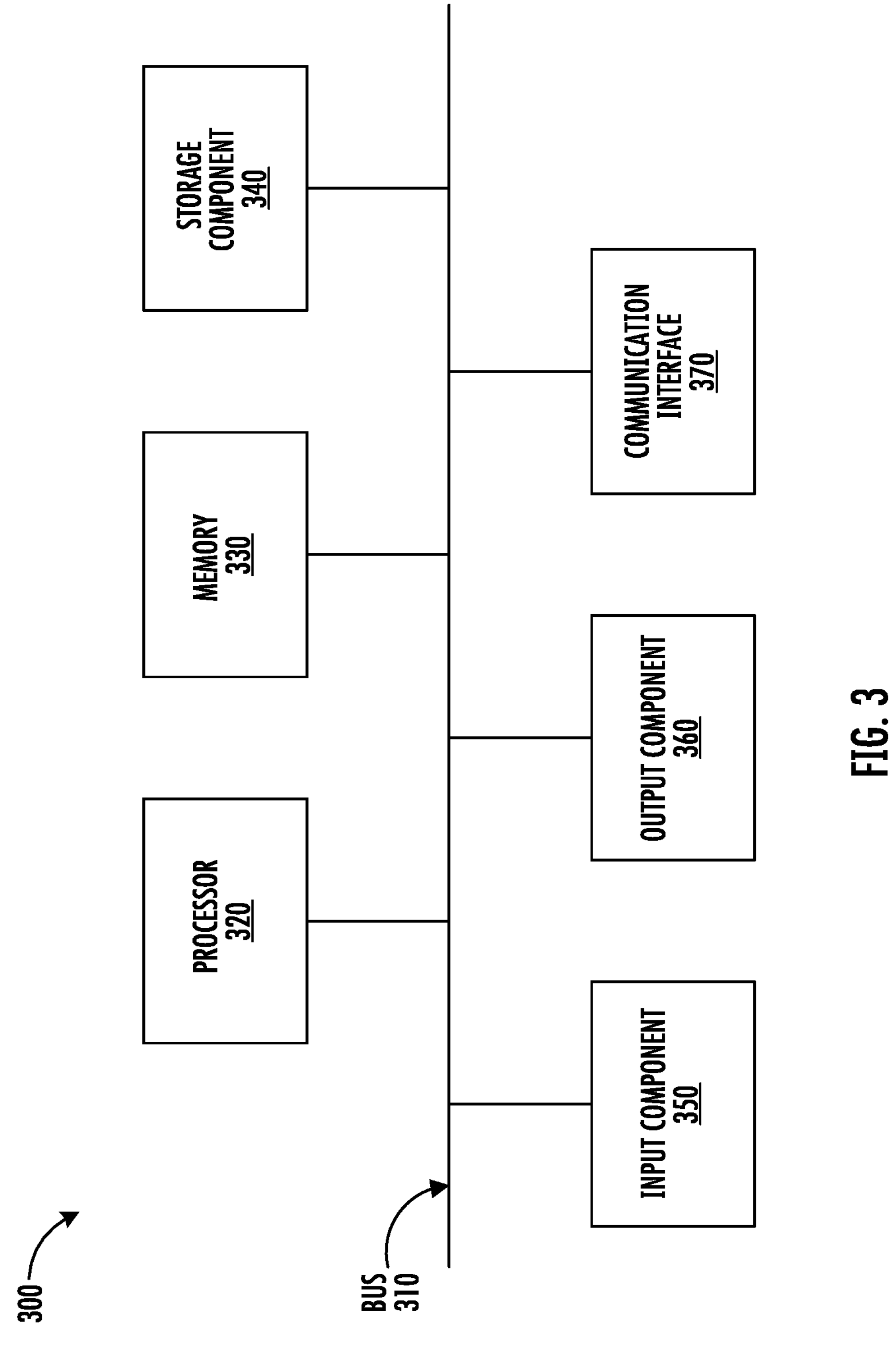

Having thus described embodiments of the invention in general terms, reference will now be made to the accompanying drawings, wherein:

FIG. 1 illustrates a system environment for reducing congestion in a network using per-hop telemetry-based network congestion control, in accordance with an embodiment of the invention;

FIG. 2 illustrates a method for reducing congestion in a network using per-hop telemetry-based network congestion control, in accordance with an embodiment of the invention; and FIG. 3 is a diagram of example components of a device, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Furthermore, when it is said herein that something is "based on" something else, it may be based on one or more other things as well. In other words, unless expressly indicated otherwise, as used herein "based on" means "based at least in part on" or "based at least partially on." Also, as used herein, the term "or" is intended to be inclusive when used in a series and may be used interchangeably with "and/or," unless explicitly stated otherwise (e.g., if used in combination with "either" or "only one of"). Like numbers refer to like elements throughout. No element, act, or instruction used herein should be construed as critical or essential unless explicitly described as such.

As noted, network congestion occurs when a network device or node in a network is required to carry more data traffic than it is capable of transmitting or forwarding, resulting in deterioration of service quality. Typical effects of congestion include queueing delay, packet loss, and blocking of new connections. Network adapters use conventional congestion control techniques to try to mitigate congestion. Within a network, each network device may be configured to append, in response to receiving a packet via a given hop, telemetry data (e.g., queue length, link utilization, and/or the like) for the given hop to existing telemetry data in the packet (e.g., in a header of the packet). Furthermore, when a packet reaches its destination network adapter, conventional destination network adapters are configured to combine all of the telemetry data and transmit a response packet including the combined telemetry data back to the network adapter that sent the packet (i.e., the sender network adapter). In conventional congestion control mechanisms, the sender network adapter then uses the combined telemetry data to update a flow rate for the flow of data through the network used to send the packet and adjusts a rate of transmission based on the flow rate in a way that reduces congestion. However, such conventional congestion control mechanisms fail to consider that (i) a single hop within a given flow may be the primary cause of congestion in the given flow and (ii) such a single hop causing congestion may also be a part of other flows through the network.

Some embodiments described herein provide a method for reducing congestion in a network using per-hop telemetry data and network adapters implementing such a method. As compared to conventional congestion control mechanisms, the method may include sharing telemetry data between flows on a per-hop basis to accelerate the convergence of congestion control efforts in a multi-flow network environment. The method may generally apply to networks having a known, multi-level topology where parallel paths may be assumed to have equal cost.

In some embodiments, a destination network adapter may be configured to generate a response packet that includes all of the telemetry data for a packet without combining it, such that the response packet includes distinct telemetry data for each hop in the flow. A sender network adapter may be configured to parse the telemetry data in the response packet to determine the queue length and the link utilization for each hop in the flow through the network, which it may then use to determine a hop rate for each hop in the flow. The sender network adapter may be configured to use the determined hop rates for the hops in the flow and the known topology of the network to update flow rates of other flows that include the same hops.

For example, a sender network adapter may send a packet over a first flow through the network that includes a switch (e.g., a port of the switch), receive a response packet including telemetry data for the switch (e.g., the port of the switch), and determine a hop rate for the switch (e.g., the port of the switch). In such an example, the sender network adapter may update a flow rate of a second flow that also includes the switch (e.g., the port of the switch) using the determined hop rate. In this way, network adapters may update flow rates on a per-hop basis and adjust transmission rates on flows accordingly to reduce congestion in the network.

FIG. 1 illustrates a system environment 100 for reducing congestion in a network 110 using per-hop telemetry-based network congestion control, in accordance with an embodiment of the invention. As shown in FIG. 1, the system environment 100 may include the network 110, which may include multiple networks devices 112-122 (e.g., switches) with network devices 112-118 on a first network level 124 and network devices 120, 122 on a second network level 126. Although only six network devices and two network levels are shown in the network 110, the network 110 may include fewer network devices, more network devices, fewer network levels, and/or more network levels in some embodiments.

As shown in FIG. 1, the system environment 100 may include an uplink 130 communicatively connecting the network 110 to one or more other networks 140. In some embodiments, the uplink 130 may include a router, a modem, a hub, and/or the like. Additionally, or alternatively, the network 110 and/or the one or more other networks 140 may include one or more wired and/or wireless networks. For example, the network 110 and/or the one or more other networks 140 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

As also shown in FIG. 1, the system environment 100 may include network nodes 150, 160, 170, and 180 (e.g., devices, systems, routers, uplinks, and/or the like) communicatively coupled to the network 110. Although only four network nodes 150, 160, 170, and 180 are shown in the network 110, the network 110 may include fewer network nodes or more network nodes in some embodiments. Each of the depicted network nodes 150, 160, 170, and 180 includes a network adapter, which includes circuitry and a port. For example, the network node 150 includes a network adapter 152, which includes circuitry 154 and a port 156. In this regard, each of the network nodes 150, 160, 170, and 180 uses its network adapter to communicate via the network 110. In particular, the circuitry of the network adapter is configured to control the port 156 to communicate via the network 110. Using the network node 150 as an example, the network adapter 152 may use the circuitry 154 to control the port 156 to transmit packets via the network 110 in a manner that reduces congestion in the network 110 based on the telemetry data collected from the telemetry portion of packets as described herein. Although not shown in FIG. 1, the uplink 130 may include a network adapter including a port and circuitry similar to the network adapters 152, 162, 172, and 182 and configured to perform one or more of the functions described herein with respect to the network adapters 152, 162, 172, and 182.

In some embodiments, and as shown in FIG. 1, the network nodes 150, 160, 170, and 180 may transmit and receive packets, such as packet 190, via the network 110. As also shown in FIG. 1, the packet 190 may include a header 192 and payload data 194 (e.g., data that the network node 150 has instructed the network adapter 152 to transmit via the network 110). The header 192 may include a header portion (e.g., with information to route the packet 190 through the network 110 to its destination) and a telemetry portion (e.g., with telemetry data collected as the packet 190 moves through the network 110). Although the packet 190 is only shown with respect to a transmission from the network node 150, packets similar to the packet 190 may be received by the network node 150. Furthermore, packets similar to the packet 190 may be transmitted and received by the network nodes 160, 170, and 180. In some embodiments, the packet 190 may be a telemetry probe packet with no payload data 194 or token payload data that is transmitted by one of the network nodes 150, 160, 170, and 180 to obtain telemetry data regarding one or more of the flows and/or one or more of the hops of the network 110.

As shown in FIG. 1, the network devices 112-118 of the first network level 124 may be communicatively connected to the network devices 120-122 of the second network level 126. As also shown in FIG. 1, the network devices 112-118 of the first network level 124 may not be communicatively connected to each other, and the network devices 120-122 of the second network level 126 may not be communicatively connected to each other. In some embodiments, the network nodes 150, 160, 170, and 180 may only be able to communicate via the network 110 via the network devices 112-118 of the first network level 124. Furthermore, in some embodiments, a given network node of the network nodes 150, 160, 170, and 180 may only be able to communicate over the network 110 via one of or a subset of the network devices 112-118 of the first network level 124.

For example, the network node 150 may only be able to communicate over the network 110 via the network device 112, and the network node 180 may only be able to communicate over the network 110 via the network device 118. In such an example, the network node 150 may be able to transfer packets to the network node 180 via a first flow that includes a first hop from the network node 150 to the network device 112, a second hop from the network device 112 to the network device 120, a third hop from the network device 120 to the network device 118, and a fourth hop from the network device 118 to the network node 180.

Continuing with this example, the network node 150 may transmit, using the network adapter 152, the packet 190 via the first flow to the network node 180. When the network device 112 receives the packet 190, the network device 112 may append telemetry data from the first hop with an identifier indicating that the telemetry data is from the first hop to the telemetry portion of the header 192 and may transmit the packet 190 to the network device 120. When the network device 120 receives the packet 190, the network device 120 may append telemetry data from the second hop with an identifier indicating that the telemetry data is from the second hop to the telemetry portion of the header 192 (e.g., by adding the telemetry data from the second hop to the telemetry portion that already includes the telemetry data from the first hop) and may transmit the packet 190 to the network device 118.

When the network device 118 receives the packet 190, the network device 118 may append telemetry data from the third hop with an identifier indicating that the telemetry data is from the third hop to the telemetry portion of the header 192 and may transmit the packet 190 to the network node 180. When the network node 180 receives the packet 190, the network node 180, using the network adapter 182, may append telemetry data from the fourth hop with an identifier indicating that the telemetry data is from the fourth hop to the telemetry portion of the header 192. The network node 180 may then transmit, using the network adapter 182, a response packet including telemetry data for each hop of the first flow (e.g., from the appended telemetry data in the header 192) back to the network node 150 over the network 110 via the first flow but in the opposite direction.

The network node 150 may receive, using the network adapter 152, the response packet including the telemetry data for each hop of the first flow. As further described herein with respect to FIG. 2, the network adapter 152 may be configured to determine (using the telemetry data) hop rates for the hops of the first flow. For example, the network adapter 152 may be configured to determine a hop rate for each of the first, second, third, and fourth hops. In other words, rather than using the telemetry data to determine a flow rate for the first flow, the network adapter 152 may be configured to determine hop rates for the hops of the first flow.

Using the same example, the network node 150 may also be able to transfer packets to the network node 180 via a second flow that includes the first hop from the network node 150 to the network device 112, a fifth hop from the network device 112 to the network device 122, a sixth hop from the network device 122 to the network device 118, and the fourth hop from the network device 118 to the network node 180. When the network adapter 152 determines a flow rate for transmitting packets via the second flow, the network adapter 152 may be configured to determine the flow rate based on the hop rates for the first hop (e.g., from network node 150 to network device 112) and the fourth hop (e.g., from the network device 118 to the network node 180).

As noted, the network nodes 150, 160, 170, and 180 respectively include network adapters 152, 162, 172, and 182, which respectively include circuitries 154, 164, 174, and 184 and ports 156, 166, 176, and 186. In this regard, each of the circuitries 154, 164, 174, and 184 may be configured to perform elements of the process described above and the method described herein with respect to FIG. 2.

For example, in an instance in which the network adapters 152, 162, 172, and 182 are transmitting packets, each of the circuitries 154, 164, 174, and 184 may be configured to transmit, using its respective port, a packet to another network adapter via a first flow through the network 110, where the first flow includes multiple hops. Each of the circuitries 154, 164, 174, and 184 may be configured to receive, at the port and in response to transmitting the packet, a response packet from the other network adapter, where the response packet includes telemetry data for each hop of the first flow. Each of the circuitries 154, 164, 174, and 184 may be configured to determine, in response to receiving the response packet, hop rates for the multiple hops of the first flow using the telemetry data.

In some embodiments, each of the circuitries 154, 164, 174, and 184 may be configured to determine, for at least two hops of the first flow, a hop rate for each hop of the at least two hops. Each of the circuitries 154, 164, 174, and 184 may be configured to determine a hop rate for a given hop based on at least one of a current state of the given hop, the queue length of the given hop, or the link utilization of the given hop.

As noted, the network devices 112-122 of the network 110 may be configured to, in response to receiving a given packet via a given hop, append telemetry data for the given hop to any existing telemetry data in the given packet. In this regard, each of the circuitries 154, 164, 174, and 184 may be configured to, in response to receiving a response packet including appended telemetry data, parse the appended telemetry data to determine hop rates for hops of the first flow (e.g., hop rates for two or more hops, hop rates for three or more hops, a hop rate for each of the hops, and/or the like).

After determining hop rates for hops of the first flow, each of the circuitries 154, 164, 174, and 184 may be configured to determine a flow rate of a second flow through the network 110 using a determined hop rate of at least one hop of the first flow, where the second flow is different from the first flow and the second flow includes the at least one hop. In some embodiments, each of the circuitries 154, 164, 174, and 184 may be configured to determine flow rates for flows through the network 110 based on a multi-level topology of the network 110. For example, each of the circuitries 154, 164, 174, and 184 may be configured using the multi-level topology of the network 110, such that the each of the circuitries 154, 164, 174, and 184 accounts for the fact that the fourth hop from the network device 118 to the network node 180 is in both the previously described first flow and the previously described second flow.

In some embodiments, each of the circuitries 154, 164, 174, and 184 may be configured to determine the flow rate of the second flow by determining hop rates for hops of the second flow. For example, each of the circuitries 154, 164, 174, and 184 may be configured to determine, for each hop of the second flow, a hop rate and determine a lowest hop rate of the hop rates for the hops of the second flow. Each of the circuitries 154, 164, 174, and 184 may be configured to determine that the flow rate of the second flow is the lowest hop rate. In other words, each of the circuitries 154, 164, 174, and 184 may be configured to determine the flow rate of the second flow based on the lowest hope rate for the hops of the second flow. By setting the flow rate of the second flow to the lowest hop rate for the hops of the second flow, the network adapters 152, 162, 172, and 182 may reduce congestion in the second flow by ensuring that the hop with the lowest hop rate does not receive more packets than it can receive and transmit. For example, each of the ports 156, 166, 176, and 186 of the network adapters 152, 162, 172, and 182 may include a queue pair for receiving and transmitting packets, and each of the circuitries 154, 164, 174, and 184 may be configured to schedule its queue pair for transmitting via the second flow based on the lowest hop rate.

In some embodiments, when the network adapters 152, 162, 172, and 182 are receiving packets, each of the circuitries 154, 164, 174, and 184 may be configured to receive, using it respective port, a packet transmitted by another network adapter via a first flow through the network 110, where the first flow includes multiple hops. Each of the circuitries 154, 164, 174, and 184 may be configured to generate, in response to receiving the packet, a response packet including telemetry data for each hop of the first flow (e.g., distinct telemetry data for each hop, rather than combined telemetry data for the first flow) and transmit, using its respective port, the response packet to the other network adapter.

As noted, the network devices 112-122 of the network 110 may be configured to, in response to receiving a given packet via a given hop, append telemetry data for the given hop to any telemetry data in the given packet. In this regard, each of the circuitries 154, 164, 174, and 184 may be configured to determine, in response to receiving the packet, which network device in the first flow appended each appended element of the telemetry data. For example, each of the circuitries 154, 164, 174, and 184 may be configured to determine which network device in the first flow appended each appended element of the telemetry data based on the multi-level topology of the network 110 (e.g., based on an order of the appended elements in the telemetry data and the order of the hops in the first flow). In this way, the network adapters 152, 162, 172, and 182 may generate and transmit response packets that allow other transmitting network adapters to adjust flow rates on a per-hop basis to reduce congestion in the network 110. Furthermore, by adjusting the flow rates on a per-hop basis, the network adapters 152, 162, 172, and 182 may react more quickly to changes in hop rates within the network 110 and reduce congestion in the network 110 more quickly than in systems where flow rates are adjusted based on telemetry data for complete flows.

As will be appreciated by one of ordinary skill in the art in view of the present disclosure, the above-described manner in which the network adapters 152, 162, 172, and 182 use per-hop telemetry data from the first flow to adjust flow rates over the second flow may be applied to other flows through the network 110. In other words, the network adapters 152, 162, 172, and 182 (e.g., using the circuitries 154, 164, 174, and 184, respectively) may use the known topology of the network 110 and per-hop telemetry data received from any flow through the network 110 to determine flow rates of any other flows through the network 110. For example, when determining a flow rate for a given flow through the network 110, the network adapters 152, 162, 172, and 182 may use telemetry data associated with hops in the given flow even if the telemetry data was received via another flow through the network 110.

As will be appreciated by one of ordinary skill in the art in view of the present disclosure, the term "flow" may refer to a point-to-point connection between end nodes of a network (e.g., host devices, network nodes, network adapters, network interface cards, and/or the like). Such nodes may be assigned to pass data over a flow, and, as described herein, a pair of nodes may have multiple flows between each other. Furthermore, a flow may also have a state, such as uni-directional or bi-directional. If a flow is bi-directional, the state of the flow may have different properties for each direction through the flow.

As will also be appreciated by one of ordinary skill in the art in view of the present disclosure, within a network that includes end nodes connected via switches, the term "hop" may refer to a path between two devices, such as between two switches or between an end node and a switch. In other words, a hop may refer to a sub-path within a flow from one end node to another end node, where the flow is made up of multiple hops.

As will also be appreciated by one of ordinary skill in the art in view of the present disclosure, the term "hop rate" may refer to a maximum rate at which packets can be transmitted across the hop without increasing congestion in a network. In this regard, some embodiments of the present invention may parse and/or separate telemetry data for each hop (e.g., because the telemetry data includes an identifier indicating the hop to which the telemetry data corresponds). Accordingly, some embodiments of the present invention may implement congestion control algorithms that define hop rates individually based on telemetry data for individual hops. In such embodiments, a flow rate may be set to the minimum hop rate of the hops within the flow.

FIG. 2 illustrates a method 200 for reducing congestion in a network using per-hop telemetry-based network congestion control. In some embodiments, the network may be similar to the network 110 described herein with respect to FIG. 1. As described herein, blocks and/or steps of the method 200 may be performed by a receiving network adapter (e.g., a first network adapter) and a sending network adapter (e.g., a second network adapter). In this regard, the receiving network adapter and/or the sending network adapter may be similar to one or more of the network adapters 152, 162, 172, and 182 described herein with respect to FIG. 1. For example, the receiving network adapter and/or the sending network adapter may each include a port and circuitry, where the circuitry is configured to perform one or more of the blocks and/or the steps of the method 200.

As shown in block 202, the method 200 may include receiving, at a receiving network adapter, a packet transmitted by a sending network adapter via a first flow through a network, where the first flow includes multiple hops. For example, the first flow may be similar to the first flow described herein with respect to FIG. 1, and may thus include a first hop from the network node 150 to the network device 112, a second hop from the network device 112 to the network device 120, a third hop from the network device 120 to the network device 118, and a fourth hop from the network device 118 to the network node 180. In such an example, the receiving network adapter may correspond to the network adapter 182 of the network node 180, and the sending network adapter may correspond to the network adapter 152 of the network node 150.

In some embodiments, the network may include a plurality of network devices, which may include the receiving network adapter, the sending network adapter, multiple switches, and an uplink. Each hop of the first flow may correspond to transmission of the packet from one of the network devices to another of the network devices. Furthermore, the network may have a multi-level topology, and the method 200 may include determining flow rates for flows through the network based on the multi-level topology.

In some embodiments, the packet received at the receiving network adapter may be a telemetry probe packet transmitted by the sending network adapter via the first flow. Additionally, or alternatively, the packet may include a telemetry header for collecting telemetry data.

As shown in block 204, the method 200 may include transmitting, using the receiving network adapter, to the sending network adapter and in response to receiving the packet, a response packet including telemetry data for each hop of the first flow. For example, the telemetry data may be telemetry data for each hop appended to the packet by each network device in the first flow (e.g., in a telemetry portion of a header of the packet). In some embodiments, the telemetry data may include a queue length, a link utilization, latency, a number of flows, and/or the like for each hop of the first flow. In such embodiments, the method 200 may include determining a hop rate for a given hop based on a current state of the given hop, the queue length of the given hop, and/or the link utilization of the given hop.

As shown in block 206, the method 200 may include receiving, at the sending network adapter, the response packet. For example, the sending network adapter may receive the response packet using a port (e.g., similar to one or more of the ports 156, 166, 176, and 186 described herein with respect to FIG. 1).

As shown in block 208, the method 200 may include determining, using the sending network adapter, in response to receiving the response packet and using the telemetry data, hop rates for the multiple hops of the first flow. For example, the method 200 may include determining, for at least two hops of the first flow, a hop rate for each hop of the at least two hops. Additionally, or alternatively, the method 200 may include determining, for each hop of the first flow, a hop rate.

In some embodiments, the method 200 may include determining, using the sending network adapter, a flow rate of a second flow through the network using a determined hop rate of at least one hop of the first flow, where the second flow is different from the first flow, and where the second flow includes the at least one hop. For example, the method 200 may include determining hop rates for hops of the second flow by determining, for each hop of the second flow, a hop rate, determining a lowest hop rate of the hop rates for the hops of the second flow, and determining that the flow rate of the second flow corresponds to the lowest hop rate.

As will be appreciated by one of ordinary skill in the art in view of the present disclosure, the method 200 of using per-hop telemetry data from a first flow to adjust flow rates over a second flow may be applied to other flows through a network. In other words, the method 200 may include using the known topology of the network and per-hop telemetry data received from any flow through the network to determine flow rates of any other flows through the network. For example, when determining a flow rate for a given flow through the network, the method 200 may include using telemetry data associated with hops in the given flow even if the telemetry data was received via another flow through the network.

The method 200 may include additional embodiments, such as any single embodiment or any combination of embodiments described above and/or in connection with one or more other processes described elsewhere herein. Although FIG. 2 shows example blocks of the method 200, in some embodiments, the method 200 may include additional blocks, fewer blocks, different blocks, or differently arranged blocks than those depicted in FIG. 2. Additionally, or alternatively, two or more of the blocks of the method 200 may be performed in parallel and/or simultaneously.

FIG. 3 is a diagram of example components of a device 300. In some embodiments, the device 300 may correspond to one or more of the network devices, one or more of the network nodes, one or more of the network adapters, and/or the uplink described herein with respect to FIG. 1. Additionally, or alternatively, one or more of the network devices, one or more of the network nodes, one or more of the network adapters, and/or the uplink described herein with respect to FIG. 1 may include one or more devices 300 and/or one or more components of the device 300. As shown in FIG. 3, the device 300 may include a bus 310, a processor 320, a memory 330, a storage component 340, an input component 350, an output component 360, and a communication interface 370.

The bus 310 may include a component that permits communication among multiple components of the device 300. The processor 320 may be implemented in hardware, firmware, and/or a combination of hardware and software. The processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 may include one or more processors capable of being programmed to perform a function. The memory 330 may include a random-access memory (RAM), a read only memory (ROM), and/or another type of dynamic or static storage device (e.g., a flash memory, a magnetic memory, and/or an optical memory) that stores information and/or instructions for use by the processor 320.

The storage component 340 may store information and/or software related to the operation and use of the device 300. For example, the storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

The input component 350 may include a component that permits the device 300 to receive information, such as via user input (e.g., input received from a user through a touch screen display, a keyboard, a keypad, a mouse, a button, a switch, and/or a microphone). Additionally, or alternatively, the input component 350 may include a component for determining location (e.g., a global positioning system (GPS) component) and/or a sensor (e.g., an accelerometer, a gyroscope, an actuator, another type of positional or environmental sensor, and/or the like). The output component 360 may include a component that provides output information from the device 300 (via, e.g., a display, a speaker, a haptic feedback component, an audio or visual indicator, and/or the like).

The communication interface 370 may include a transceiver-like component (e.g., a transceiver, a separate receiver, a separate transmitter, and/or the like) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

The device 300 may perform one or more processes described herein. The device 300 may perform these processes based on the processor 320 executing software instructions stored by a non-transitory computer-readable medium, such as the memory 330 and/or the storage component 340. As used herein, the term "computer-readable medium" refers to a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardware circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely method embodiment, an entirely software embodiment (including firmware, resident software, micro-code, stored procedures in a database, or the like), an entirely hardware embodiment, or an embodiment combining method, software, and hardware aspects that may generally be referred to herein as a "system." Furthermore, embodiments of the present invention may take the form of a computer program product that includes a computer-readable storage medium having one or more computer-executable program code portions stored therein. As used herein, circuitry, a processor, and/or a processing device, which may include one or more circuits and/or processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium and/or a non-transitory storage device, such as a tangible electronic, magnetic, optical, electromagnetic, infrared, and/or semiconductor system, device, and/or other apparatus. For example, in some embodiments, the non-transitory computer-readable medium and/or the non-transitory storage device may include a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may be in object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, such as the memory 330 in FIG. 3) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other changes, combinations, omissions, modifications, and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A method for reducing congestion in a network, the method comprising:

receiving, at a first network adapter, a packet transmitted by a second network adapter via a first flow through a network, wherein the first flow comprises multiple hops;

transmitting, using the first network adapter, to the second network adapter and in response to receiving the packet, a response packet comprising distinct telemetry data for each hop of the first flow;

receiving, at the second network adapter, the response packet; and determining, using the second network adapter and using the telemetry data, hop rates for each of the multiple hops of the first flow, wherein determining hop rates comprises determining a hop rate for a given hop based on at least one of a current state of the given hop, a queue length of the given hop, and a link utilization of the given hop.

2. The method of claim 1, comprising determining the hop rates for the multiple hops of the first flow in response to receiving the response packet.

3. The method of claim 1, comprising determining, for at least two hops of the first flow, a hop rate for each hop of the at least two hops.

4. The method of claim 1, comprising determining, for each hop of the first flow, a hop rate.

5. The method of claim 1, wherein the telemetry data comprises a queue length and a link utilization for each hop of the first flow.

6. The method of claim 5, wherein determining hop rates for the multiple hops of the first flow comprises determining a hop rate for a given hop based on the current state of the given hop, the queue length of the given hop, and the link utilization of the given hop.

7. The method of claim 1, further comprising determining, using the second network adapter, a flow rate of a second flow through the network using a determined hop rate of at least one hop of the first flow, wherein the second flow is different from the first flow, and wherein the second flow comprises the at least one hop.

8. The method of claim 7, wherein determining the flow rate of the second flow comprises:

determining hop rates for hops of the second flow by determining, for each hop of the second flow, a hop rate;

determining a lowest hop rate of the hop rates for the hops of the second flow; and determining that the flow rate of the second flow is the lowest hop rate.

9. The method of claim 1, wherein the network comprises a plurality of network devices, wherein the plurality of network devices comprises the first network adapter, the second network adapter, multiple switches, and an uplink, and wherein each hop of the first flow corresponds to the packet passing from one of the network devices to another of the network devices.

10. The method of claim 1, wherein the network has a multi-level topology, the method further comprising determining flow rates for flows through the network based on the multi-level topology.

11. The method of claim 1, wherein the packet is a telemetry probe packet.

12. The method of claim 1, wherein the packet comprises a telemetry header for collecting the telemetry data.

13. The method of claim 1, wherein each hop rate of the hop rates corresponds to a maximum rate at which packets can be transmitted across a given hop of the multiple hops without increasing congestion in the network.

14. A method for reducing congestion in a network, the method comprising:

transmitting a packet to another network adapter via a first flow through the network, wherein the first flow comprises multiple hops;

receiving, in response to transmitting the packet, a response packet from the other network adapter, wherein the response packet comprises distinct telemetry data for each hop of the first flow; and determining, in response to receiving the response packet, hop rates for each of the multiple hops of the first flow using the telemetry data, wherein determining hop rates comprises determining a hop rate for a given hop based on at least one of a current state of the given hop, a queue length of the given hop, and a link utilization of the given hop.

15. The method of claim 14, wherein each hop rate of the hop rates corresponds to a maximum rate at which packets can be transmitted across a given hop of the multiple hops without increasing congestion in the network.

16. A network adapter coupled to a network, the network adapter comprising:

a port configured to transmit and receive packets on a network; and circuitry communicatively coupled to the port, wherein the circuitry is configured to:

transmit, using the port, a packet to another network adapter via a first flow through the network, wherein the first flow comprises multiple hops;

receive, at the port and in response to transmitting the packet, a response packet from the other network adapter, wherein the response packet comprises distinct telemetry data for each hop of the first flow; and determine, in response to receiving the response packet, hop rates for each of the multiple hops of the first flow using the telemetry data, wherein determining hop rates comprises determining a hop rate for a given hop based on at least one of a current state of the given hop, a queue length of the given hop, and a link utilization of the given hop.

17. The network adapter of claim 16, wherein the circuitry is configured to determine, for at least two hops of the first flow, a hop rate for each hop of the at least two hops.

18. The network adapter of claim 16, wherein the telemetry data comprises a queue length and a link utilization for each hop of the first flow.

19. The network adapter of claim 18, wherein the circuitry is configured to, when determining hop rates for the multiple hops of the first flow, determine a hop rate for a given hop based on the current state of the given hop, the queue length of the given hop, and the link utilization of the given hop.

20. The network adapter of claim 16, wherein:

each network device in the network is configured to, in response to receiving a given packet via a given hop, append telemetry data for the given hop to any telemetry data in the given packet;

the telemetry data of the response packet is the appended telemetry data; and the circuitry is configured to parse, in response to receiving the response packet, the appended telemetry data to determine the hop rate for each hop of the first flow.

21. The network adapter of claim 16, wherein the circuitry is configured to determine a flow rate of a second flow through the network using a determined hop rate of at least one hop of the first flow, wherein the second flow is different from the first flow, and wherein the second flow comprises the at least one hop.

22. The network adapter of claim 21, wherein the circuitry is configured to, when determining the flow rate of the second flow:

determine hop rates for hops of the second flow by determining, for each hop of the second flow, a hop rate;

determine a lowest hop rate of the hop rates for the hops of the second flow; and determine that the flow rate of the second flow is the lowest hop rate.

23. The network adapter of claim 16, wherein the network has a multi-level topology, and wherein the circuitry is configured to determine flow rates for flows through the network based on the multi-level topology.

24. The network adapter of claim 16, wherein the packet is a telemetry probe packet.

25. The network adapter of claim 16, wherein each hop rate of the hop rates corresponds to a maximum rate at which packets can be transmitted across a given hop of the multiple hops without increasing congestion in the network.

* * * * *